US010812675B1

(12) United States Patent
Chapman

(10) Patent No.: US 10,812,675 B1
(45) Date of Patent: Oct. 20, 2020

(54) VERIFYING DOCUMENT SECURITY USING AN INFRARED VOID PANTOGRAPH MARK

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/550,746

(22) Filed: Aug. 26, 2019

(51) Int. Cl.
H04N 1/32 (2006.01)
G06T 1/00 (2006.01)
G06F 3/12 (2006.01)
G06K 19/06 (2006.01)
G06K 7/12 (2006.01)
H04N 1/00 (2006.01)

(52) U.S. Cl.
CPC ......... H04N 1/3232 (2013.01); G06F 3/1222 (2013.01); G06F 3/1243 (2013.01); G06F 3/1256 (2013.01); G06K 7/12 (2013.01); G06K 19/0614 (2013.01); G06T 1/005 (2013.01); H04N 1/0044 (2013.01); H04N 1/00883 (2013.01); H04N 1/32309 (2013.01); H04N 1/32352 (2013.01); G06T 2201/0065 (2013.01); G06T 2207/10048 (2013.01)

(58) Field of Classification Search
CPC .......... H04N 1/00838–00883; H04N 1/00925; H04N 1/32144–32352; H04N 1/32646; H04N 1/44–448; G06T 1/0021–0092
See application file for complete search history.

(56) References Cited

U.S. PATENT DOCUMENTS

| 5,734,752 | A | 3/1998 | Knox |
| 6,252,971 | B1 | 6/2001 | Wang |
| 7,032,823 | B2 | 4/2006 | Nojiri |
| 7,845,572 | B2 | 12/2010 | Wicker et al. |
| 7,869,090 | B2 | 1/2011 | Wang et al. |
| 7,894,103 | B2 | 2/2011 | Wang et al. |
| 7,894,626 | B2 | 2/2011 | Wang et al. |
| 7,999,973 | B2 | 8/2011 | Nakata et al. |
| 8,049,933 | B2 | 11/2011 | Murakami |
| 8,233,197 | B2 | 7/2012 | Wang et al. |
| 8,335,014 | B2 | 12/2012 | Muramatsu |
| 8,355,179 | B2 * | 1/2013 | Wu ...................... G03G 21/043 283/902 |
| 8,455,087 | B2 * | 6/2013 | Eschbach ............. G03G 21/046 428/195.1 |
| 8,460,781 | B2 * | 6/2013 | Eschbach ............... B41M 3/144 101/491 |

(Continued)

OTHER PUBLICATIONS

Aronoff J.S. et al., Automated Optimization of Void Pantograph Settings, Oct. 6, 2011 Hewlett-Packard Development Company, L.P.

Primary Examiner — Scott A Rogers
(74) Attorney, Agent, or Firm — Fox Rothschild LLP

(57) ABSTRACT

To generate a security mark, a system prints first and second patterns on a first document using non-infrared absorbing colors. A print engine will receive the substrate and create a copy of the security mark onto a second document. When printing the second document the print engine may use ink of an infrared-absorbing color, such as black, to print a hidden security element of the security mark. When an infrared camera captures a digital image of the second document and the captured image is displayed, the captured image will reveal the hidden security element.

32 Claims, 6 Drawing Sheets

(56) References Cited

U.S. PATENT DOCUMENTS

| | | | |
|---|---|---|---|
| 8,909,775 B2 | 12/2014 | Tredoux et al. | |
| 9,041,981 B2* | 5/2015 | Yoshida | H04N 1/4453 |
| | | | 358/3.28 |
| 9,471,846 B2 | 10/2016 | Fan et al. | |
| 9,614,995 B1 | 4/2017 | Chapman | |
| 10,009,503 B1 | 6/2018 | Chapman | |
| 10,154,165 B2* | 12/2018 | Aronoff | G06K 15/189 |
| 10,237,442 B2 | 3/2019 | Chapman et al. | |
| 10,284,740 B1* | 5/2019 | Chapman | H04N 1/02825 |
| 10,425,554 B1 | 9/2019 | Chapman | |
| 10,452,964 B1 | 10/2019 | Chapman et al. | |
| 2006/0157574 A1 | 7/2006 | Farrar et al. | |
| 2009/0060258 A1 | 3/2009 | Wang et al. | |
| 2013/0153657 A1 | 6/2013 | Loughrey et al. | |
| 2014/0369569 A1* | 12/2014 | Wicker | G06T 7/001 |
| | | | 382/112 |
| 2016/0127603 A1 | 5/2016 | Chapman et al. | |
| 2016/0132984 A1 | 5/2016 | Fan et al. | |

\* cited by examiner

US 10,812,675 B1

VERIFYING DOCUMENT SECURITY USING AN INFRARED VOID PANTOGRAPH MARK

BACKGROUND

Security is an important requirement in many printing applications. In situations such as official or government document printing, event ticket printing, financial instrument printing and the like, many printed materials must be protected against copying, forging and/or counterfeiting.

In some situations, document creators may wish to encode a security mark in a document in a way that is invisible to the human eye, but which becomes visible when the document is copied. For example, financial instruments such as checks, event admission tickets and other documents for which it is important to visually distinguish the original from a copy may include such security marks. An example of such a mark is a pantograph mark. The features of pantograph marks will be described below, but by way of example it is common to print a "void" pantograph mark on a document so that certain content of the security mark is not visible to the unaided human eye on the original, but the content will be visible on a copy of the original. An example of this is shown in FIG. 1, in which an original document 11, such as a bank check, has a security mark printed on it. The security mark shown in the example includes the word "VOID," but this word is not visible to the human eye in the original document 11. However, when a color copy 12 of the original document is printed, the word "VOID" is visible to the unaided human eye in the color copy 12.

An advantage of UV void pantographs is that a counterfeiter will not likely see the watermark; the watermark will only appear when inspected under UV light. However, due to the very small holes required to take advantage of the scanner's modulation transfer function (MTF) can degrade image quality and increase fragility of the watermark.

This document describes methods and systems for creating a pantograph mark that addresses at least some of the problems described above, and/or other problems.

SUMMARY

In various embodiments, a document security marking system includes a print device, a processor, and a computer-readable medium containing programming instructions that are configured to cause the process to print security mark on a substrate. To do this, the system will select a first pattern that includes one or more non-infrared-absorbing colors, and it will select a second pattern that also includes one or more non-infrared-absorbing colors. The first pattern and the second pattern will exhibit substantially the same color, substantially the same pattern (i.e., size and shape of objects in the image), as well as substantially the same reflectance in the infrared spectrum. The system will cause the print device to print a security mark on a first substrate in a first color space by: (a) printing either the first pattern or the second pattern as a foreground, and (ii) printing the other of the pattern as a background.

The system also may include a print engine and additional instructions to cause the print engine to create a copy of the security mark and printing the copy on a second substrate. The system also may include an infrared camera, a display, and additional programming instructions that are configured to cause a processor (which may or may not be the same as the previous processor) to, upon receipt of an image of the security mark on the second substrate captured by the infrared camera, cause the display to display the image captured by the infrared camera. The displayed image will include a watermark that is visibly different from other portions of the image on the display.

When the print device prints the security mark on the first substrate, the print device may use no infrared-absorbing ink to do so. However, when the print engine prints the copy of the security mark on the second substrate, the print engine will use at least some infrared-absorbing ink to do so.

The non-infrared-absorbing colors of the first pattern may include any or all of the following: C, M, Y, CM, CY or MY, and when printing the first pattern the print device may use any of following ink combinations: C, M, Y, CM, CY or MY. The non-infrared-absorbing colors of the second pattern may include CMY. When printing the second pattern the print device will use a CMY ink combination. The second pattern also may include C, M, Y, CM, CY and/or MY. The non-infrared-absorbing colors in each pattern of the first substrate may exclude black.

When printing the second document, the print engine may do in first color space such as a CMY color space. When displaying the image, the display may do so a second color space, such as in an RGB color space.

Optionally, when printing the security mark, the print device may print the foreground and the background at substantially equal sizes.

Optionally, the security mark may be a pantograph mark in which the foreground includes a first pattern of dots and the background comprises a second pattern of dots. The first pattern of dots exhibits a size, shape or other characteristic that differs from that of the second pattern of dots. Either the first pattern of dots or the second pattern of dots may include CMY color elements, while the other pattern of dots may not include CMY color elements.

DETAILED DESCRIPTION

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to." When this document describes items as being "substantially the same," "substantially similar" or "substantially equal," it is intended that they be not visibly distinct from each other under ambient light, and to the extent that the items have numeric values (such as color value, color temperature, or dimensions of size), the terms mean no more than +/−10%, and in some cases no more than +/−5%.

Additional terms that are relevant to this disclosure are defined at the end of this Detailed Description section.

Figure 1:
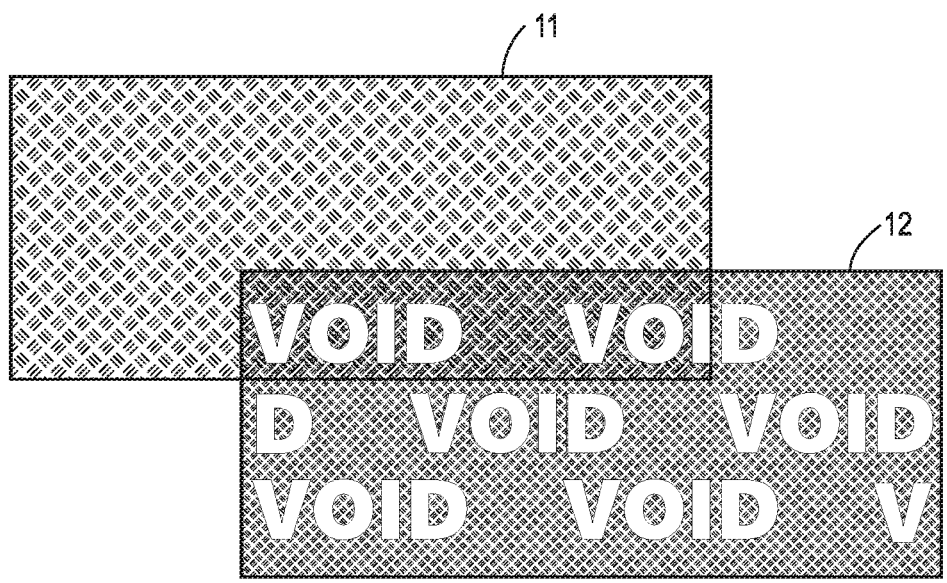
FIG. 1 illustrates an example of a document containing a void pantograph mark, along with a copy of such a document, such as may appear in the prior art.
Figure 2A:
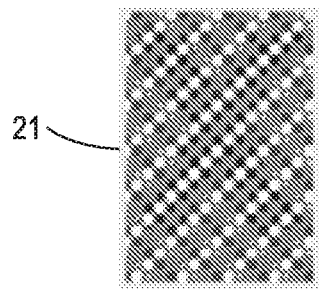
FIGS. 2A and 2B illustrate characteristics of an example pantograph mark according to the prior art.
Figure 2B:
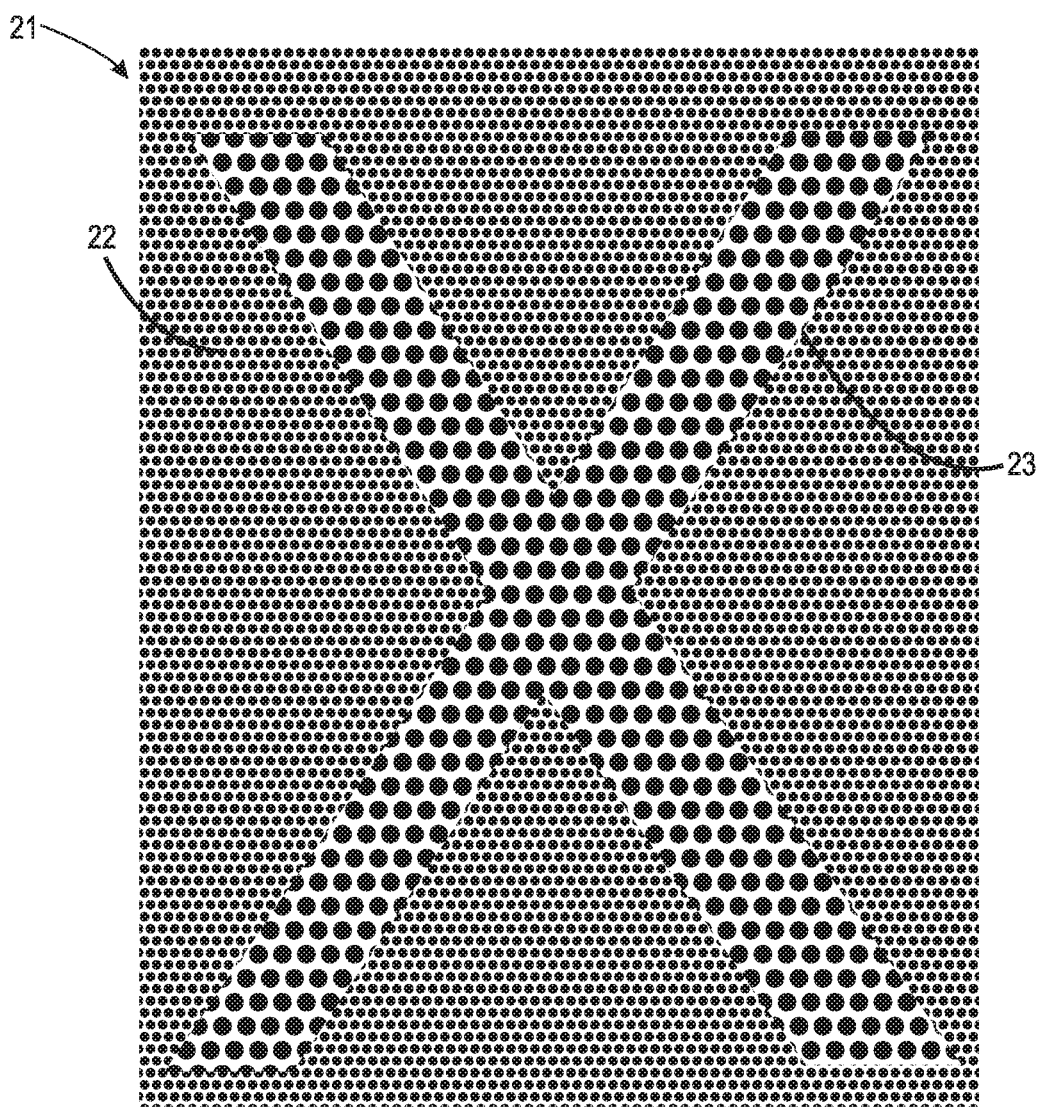

A pantograph mark is a security mark having a foreground made of a pattern with a first frequency and a background with a pattern of a second frequency. Pantograph marks are typically created using patterns of dots that are of substantially fine (i.e., of small size), and which may be interspersed with other material printed on the substrate such that the overall pattern of the mark is not readily discernable to the human eye. Commonly, a pantograph mark includes a pattern of dots of at least two sizes. Each of the two sizes of dots in a pantograph mark may have the same tone, or they may have similar but not identical tones. By varying the size and/or tone of the two classes of dots, one class may be used as a background and the other class may be used to present a foreground message in the mark One of the patterns of a pantograph may include a security element (such as a word, image or pattern) that is not visually perceivable under typical environmental conditions such as ambient light. But in certain conditions, the security element will be visually perceivable. An example of this is shown in FIGS. 2A and 2B. FIG. 2A illustrates a pantograph mark 21 at a nearly normal size in which no security element is visible at typical size (although this is slightly zoomed for illustration, so the element may be faintly visible here). However, in FIG. 2B, the pantograph mark 21 is expanded in size, revealing a background 22 of relatively smaller dots and a foreground 23 of relatively larger dots. The foreground 23 is in the shape of the letter "X". The "frequency" of each pattern is a measure of the density of dots in the pattern. For example, the frequency may be the inverse of the distance between a dot and its nearest neighbor, or a function of such a measurement.

The dots of the background of a pantograph mark may or may not have a dot frequency that is different from the dots of the foreground. For example, for a 600 dots per inch (dpi) print device, an example pantograph mark may be created with background pixel dots having a size of 2×2 pixels and a density of 10% (i.e., 10% coverage with ink on a white background), while the foreground pixel dots may have a size of 2×2 pixels and a density of about 25%. Other pixel sizes and densities are possible, and in some pantograph marks the density of the foreground may be greater than that of the background. Also, it is not necessary that the foreground dots be larger than the background dots; in some marks background dots may be larger than the foreground dots. Further, in the embodiments of this document the dots of the foreground and background may exhibit the same size but exhibit different shapes. In addition, in some embodiments the dots of one layer (foreground or background) may be printed as a CMY color while the dots of the other layer may not include any CMY color elements.

Figure 3:
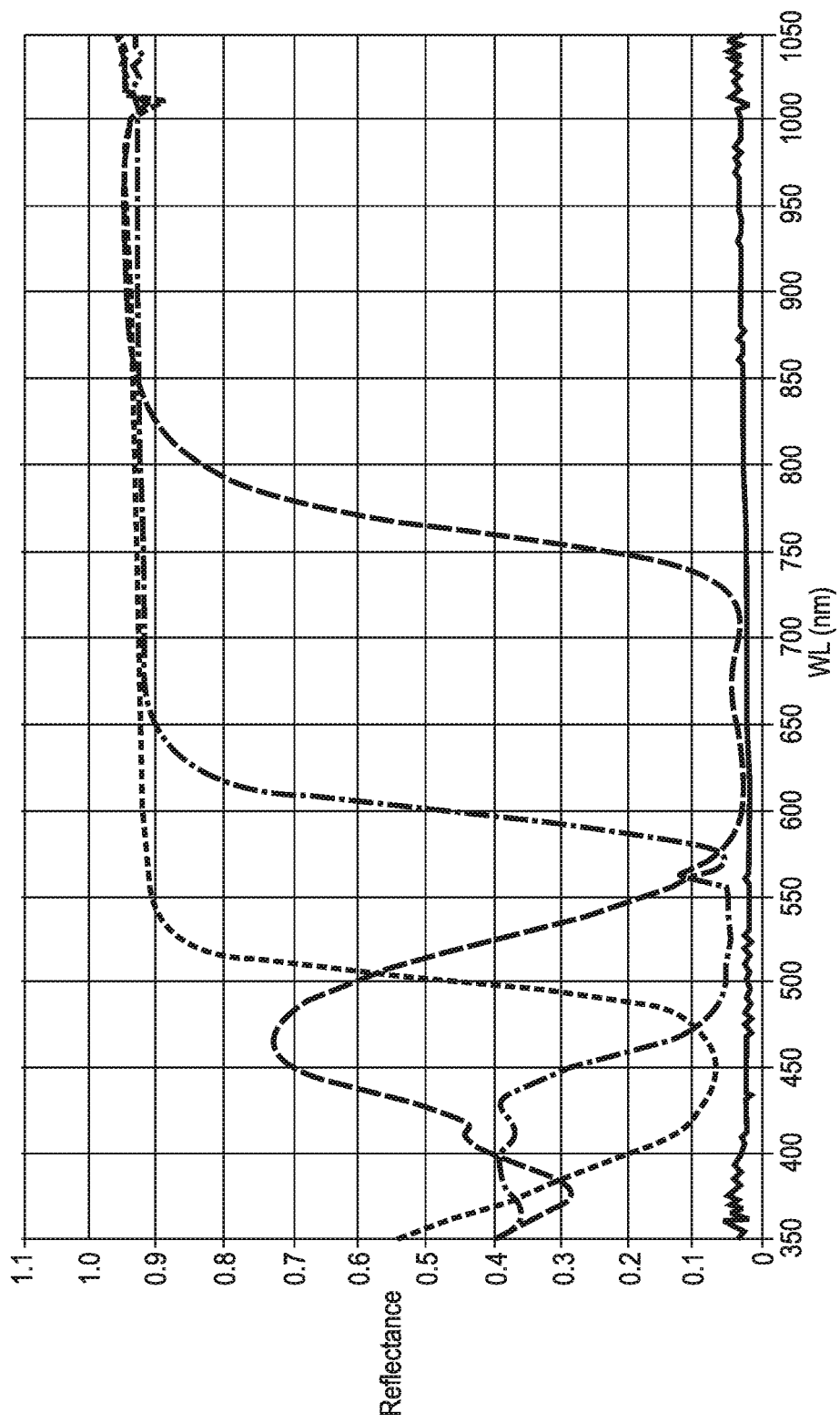
FIG. 3 illustrates spectral reflectance properties of various ink colors that may be used in the embodiments of this document.

As noted above, in a pantograph mark the security element will be perceivable only in certain conditions. In an infrared (IR) mark, either the foreground or the background is printed with an ink having IR absorption characteristics that substantially differ from those of the ink of the other components of the mark. For example, FIG. 3 illustrates that in some toner products, the black toner K 31 exhibits a substantially lower reflectance in the IR spectrum than the corresponding cyan C 32, magenta M 33 and yellow Y 34 toners. (In this example, "substantially lower" reflectance means that the lower reflectance has a value that is 50% or less of the higher reflectance value. In some embodiments, to be "substantially lower" the lower reflectance may be even less, such as 30% or less, 25% or less, 20% or less, 15% or less, or 10% or less than the value of the higher reflectance.) Thus, for toner having properties shown in FIG. 3, under IR illumination K will absorb most of the IR light while each of C, M and Y (and any combination of C, M and/or Y) will reflect most of the IR light. K is this an "infrared-absorbing" toner, while C, M and Y are "non-infrared-absorbing" colors. When a printed document having such toner imprinted on it is viewed under ultraviolet light, elements of the printed document having K toner imprinted (with or without C, M and/or Y elements) will be visibly distinct from elements having only C, M and/or Y (with no K).

This document describes creating a novel security mark that we may refer to as an "infrared (IR) void pantograph mark," in which certain security features of a photocopy of the mark are visible only in the presence of IR light. In previous pantographs, neither the original nor a photocopy will display the hidden pattern under normal (ambient) light. A problem with standard and UV pantographs that they may not work on a variety of scanner/printer combinations. They are fragile and need to be tuned for the particular hardware being used.

To address this problem in the prior art, this disclosure proposes a new printing process that yields an IR void pantograph mark in which a security element in a photocopy of the mark will be visible under IR illumination, but not in the original document under the same IR illumination. The IR void pantograph mark does not to depend on a scanner's modulation transfer function, dot size and frequency. Thus, the IR void pantograph mark is not so fragile and can be used for more detailed marks such as 2D barcodes. The process may use toners having reflectance properties such as those in FIG. 3, in which one color exhibits substantially lower reflectance properties under IR illumination than the other colors used to print the mark.

Figure 4:
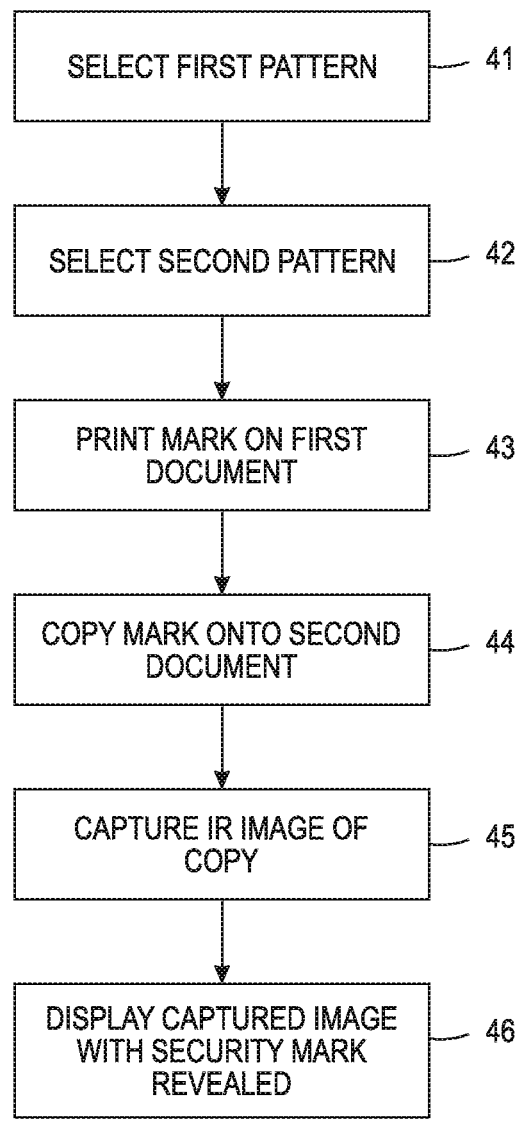
FIG. 4 illustrates an example process of printing a pantograph mark, and steps that will make a security element detectable in a photocopy.

FIG. 4 is a flow diagram illustrating various aspects of a method of printing and decoding an IR pantograph mark. A print device or a computing device generating instructions for a print device will generate the security mark by selecting a first pattern that includes one or more non-infrared-absorbing colors (at 41) and selecting a second pattern that also includes one or more non-infrared-absorbing colors (at 42). The first and second patterns will differ, for example as dots of varying size (see patterns 22 and 23 of FIG. 2B for an example), so that a security mark is encoded in either or both of the patterns.

The colors selected for the first pattern and the second pattern will exhibit substantially the same reflectance in the infrared spectrum. In this context, "substantially the same reflectance" means that a document printed with the two patterns will not appear to be visibly different from each other, whether viewed under ambient light or IR light. Measurably, this means that the overall reflectance of each pattern will be within +/−10%, or a lower threshold such as +/−5%. For example, the colors used for the first and second patterns may include various combinations of C, M and Y, but since K is an infrared-absorbing color K may be excluded from both patterns. Instead, the non-infrared-absorbing colors used to print the first pattern may include any or all of the following: C, M, Y, CM, CY or MY. The non-infrared-absorbing colors used to print the first pattern may then also include CMY, as well as any or all of C, M, Y, CM, CY or MY. The elements printed with CMY may correspond to a hidden security code that will be visible only at later steps in the process as described below.

In a pantograph mark, the first pattern may be a first pattern of dots, and the second pattern may be a second pattern of dots. The dots of the first pattern may differ from those of the second pattern in shape, size, CMY vs. non-CMY, chemical properties of inks used, or by other characteristics.

The print device will then print the first and second patterns on a substrate (at 43) by printing the first pattern as the foreground and the second pattern as a foreground, or vice versa. When printing occurs (at 43), optionally the foreground and background may be printed on an area that is of substantially the same size (i.e., within a common boundary, with edges not visibly distinct under ambient or IR light), such as in prior marks such as that shown in FIG. 2A.

After the security mark is printed on a first document, at 44 a print engine will create a copy of the security mark onto a second document. The print engine may be that of the same print device that printed the original, or it may be a print engine of a separate print device. However, the print engine will not be subject to the same restrictions as applied when printing the original. In particular, when printing the elements that correspond to the hidden security code the copy the print engine may use ink of an infrared-absorbing color, such as black (K). In particular, when copying elements of the mark that were printed in CMY in the original, the system may use the infrared-absorbing ink such as K. The print engine will not require any special programming for this, as in standard print engines CMY may appear to as having that require of K to duplicate those elements. Thus, the printed copy may appear visibly similar to the original when viewed under ambient light. However, since the printed copy now uses some infrared-absorbing ink, the elements printed with that ink may be revealed under IR imaging.

To detect such a photocopy, after the second document is printed, at 45 an infrared camera may capture a digital image of the substrate. The infrared camera may be an element of a multifunction print device, or it may be a separate device. The camera may be an off-the shelf IR cameras, a webcam with its IR filter removed, and optionally, security IR cameras for night.

The camera may then transfer the digital image to a processor that is connected to a display device. At 46 the display device will display the captured image of the mark in a color space (such as RGB) that is different from that (such as CMY) used to print the first (original) and second (copy) documents. The displayed image will reveal a watermark (i.e., security element) that is visibly different from other portions of the image on the display, as the elements that were printed with infrared-absorbing ink on the copy (second) will now appear visibly different from the other elements of the copy.

Figure 5:
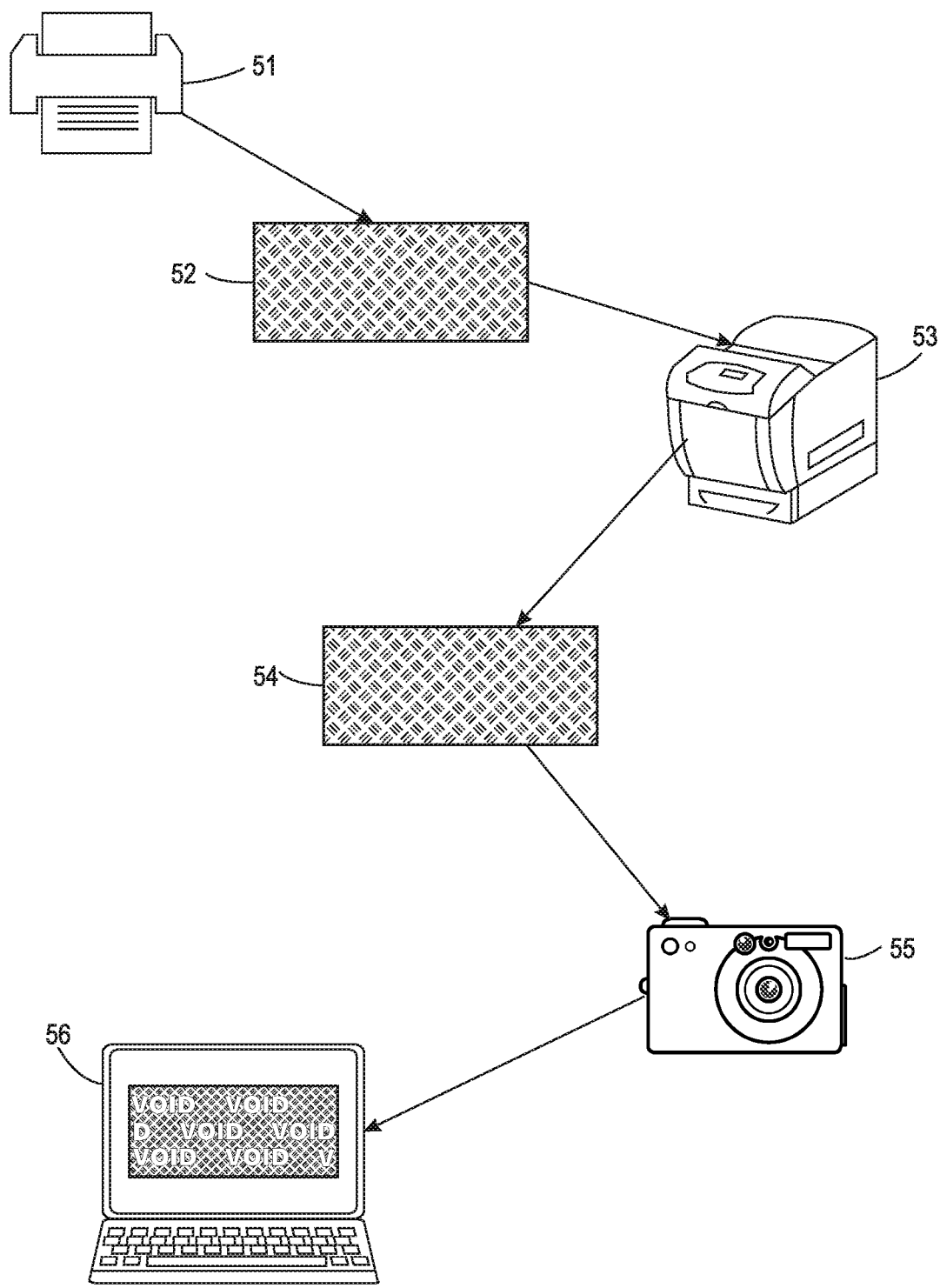
FIG. 5 illustrates example hardware elements that may perform the process of FIG. 4.

FIG. 5 illustrates how certain hardware elements may perform the process described above. A print device 51 will then print the security mark including the first and second patterns on a substrate as a first document 52. A print engine 53 will receive the substrate and create a copy of the security mark onto a second document 54. The print engine 53 may be that of the same print device 51 that printed the original, or it may be a print engine of a separate print device as shown in FIG. 5. When printing the second document 54 the print engine 53 may use ink of an infrared-absorbing color, such as black, to print a security element that was printed with only a combination of non-infrared absorbing colors (such as CMY) in the original. The second document 54 may appear visibly similar to the first document 52 when viewed under ambient light. However, since the second document 54 now uses some infrared-absorbing ink, the elements printed with that ink may be visible to an infrared camera. After the second document 54 is printed, at an infrared camera 55 may capture a digital image of the second document 54. The infrared camera may be an element of a multifunction print device, or it may be a separate device. The infrared camera 55 may then transfer the digital image to a processor that is connected to a display device 56, which will display the captured image of the mark with the security element revealed. The display device 56 may be integral with the infrared camera 55, or it may be part of a separate electronic device as shown in FIG. 5.

While the embodiments described above illustrate an example in which the black ink (K) exhibits substantially different reflectance than other colors (C/M/Y) and is thus not used to print the original mark, the invention is not limited to this embodiment. Other color combinations may be used—or inks of the same color but different chemical properties—may be used so long as one ink exhibits substantially different reflectance from the others, and that ink is not used to create the original mark.

The methods described above may be implemented by a processing device and communicatively connected or integral print device. A memory may include programming instructions that, when executed by the processor, cause the print device to print documents and scan documents, and which cause the processor to analyze scanned data, to implement the processes described above.

Figure 6:
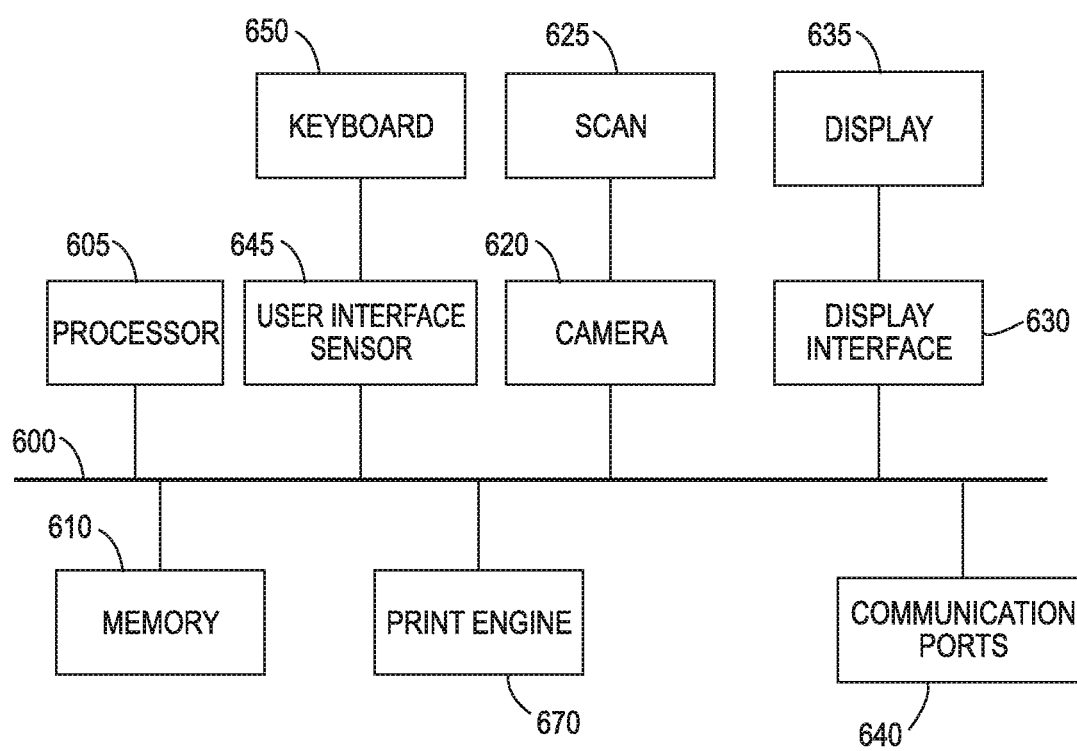
FIG. 6 is a block diagram showing various equipment that may be used to implement various embodiments of the processes described in this document.

FIG. 6 depicts an example of internal hardware that may be included in any of the electronic components of the system, such as a print device having a processing capability, or a local or remote computing device that is in communication with the print device, or a barcode scanning device. In FIG. 6, an electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 610 that may store the programming instructions. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. In embodiments where the electronic device is the smartphone or another image capturing device, digital images of a document or other image content may be acquired via a camera 620 that can capture video and/or still images. In embodiments where the electronic device includes a print device, the print device may include a print engine 670 with components such as a print head, document feeding system and other components typically used in print devices.

In this disclosure, the term "document" refers to any substrate onto which content is or has been printed. The content may be printed on the substrate using toner and/or ink. The document may, for example, include one or more areas comprising characters, and/or one or more other areas comprising images.

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 6.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

A "print device" or "print engine" is a device that is configured to print a document based on digital data, or a multi-functional device in which one of the functions is printing based on digital data. Example components of a print device include a print head, which may include components such as a print cartridge or reservoir containing ink, toner or another print material, as well as a document feeding system configured to pass a substrate through the print device so that the print head can print characters and/or images on the substrate.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating a security mark on a document, the method comprising:
   selecting a first pattern that comprises one or more non-infrared-absorbing colors;
   selecting a second pattern that comprises one or more non-infrared-absorbing colors, wherein the first pattern and the second pattern exhibit substantially the same reflectance in the infrared spectrum;
   by a print device, printing a security mark on a first substrate in a first color space, wherein the printing comprises:
      printing one of the first pattern or the second pattern as a foreground, and
      printing the other of the first pattern or the second pattern as a background;
   by a print engine, creating a copy of the security mark and printing the copy of the security mark on a second substrate;
   by an infrared camera, capturing an image of security mark as printed on the first substrate; and
   by a display, displaying the image captured by the infrared camera, wherein the displayed image reveals a watermark that is different from other portions of the image on the display.

2. The method of claim 1, wherein:
   printing, by the print device, the security mark on the first substrate comprises using no infrared-absorbing ink to do so; and
   printing, by the print engine, the copy of the security mark on the second substrate comprises using infrared-absorbing ink to do so.

3. The method of claim 1, wherein:
   the non-infrared-absorbing colors of the first pattern comprise any or all of the following: C, M, Y, CM, CY or MY;
   printing the first pattern comprises printing elements using any of the following ink combinations: C, M, Y, CM, CY or MY;
   the non-infrared-absorbing colors of the second pattern comprise CMY; and
   printing the second pattern comprises printing elements using a CMY ink combination.

4. The method of claim 3, wherein:
   the non-infrared-absorbing colors of the second pattern also comprise any or all of the following: C, M, Y, CM, CY or MY; and
   printing the second pattern comprises printing elements using any of the following ink combinations: C, M, Y, CM, CY or MY.

5. The method of claim 4, wherein the non-infrared-absorbing colors exclude black.

6. The method of claim 1, wherein
printing, by the print engine, the second document comprises printing the second document in a CMY color space; and
displaying, by the display, the image comprises displaying the image in a second color space; and
the second color space is an RGB color space.

7. The method of claim 1, wherein printing the security mark comprises printing the foreground and the background at substantially equal sizes.

8. The method of claim 1, wherein the security mark is a pantograph mark in which:
the foreground comprises a first pattern of dots;
the background comprises a second pattern of dots.

9. The method of claim 8, wherein the first pattern of dots exhibits a size or shape that differs from that of the second pattern of dots.

10. The method of claim 8, wherein either the first pattern of dots or the second pattern of dots includes CMY color elements, while the other pattern of dots does not include CMY color elements.

11. A document security marking system, the system comprising:
a processor
a print device;
a print engine;
an infrared camera;
a display; and
a computer-readable medium containing programming instructions that are configured to cause the processor to:
select a first pattern that comprises one or more non-infrared-absorbing colors,
select a second pattern that comprises one or more non-infrared-absorbing colors, wherein the first pattern and the second pattern exhibit substantially the same reflectance in the infrared spectrum, and
cause the print device to print a security mark on a first substrate in a first color space by:
printing one of the first pattern or the second pattern as a foreground; and
printing the other of the first pattern or the second pattern as a background,
cause the print engine to create a copy of the security mark and print the copy of the security mark on a second substrate, and
cause a processor to, upon receipt of an image that is of the security mark on the second substrate and that is captured by the infrared camera:
cause the display to display the image captured by the infrared camera, wherein the displayed image reveals a watermark that is different from other portions of the image on the display.

12. The system of claim 11, wherein:
the instructions to cause the print device to print the security mark on the first substrate comprise instructions to using no infrared-absorbing ink to do so; and
the instructions to cause the print engine to print the copy of the security mark on the second substrate comprise instructions to use infrared-absorbing ink to do so.

13. The system of claim 11, wherein:
the non-infrared-absorbing colors of the first pattern comprise any or all of the following: C, M, Y, CM, CY or MY;
the instructions to print the first pattern comprise instructions to print elements using any of the following ink combinations: C, M, Y, CM, CY or MY;
the non-infrared-absorbing colors of the second pattern comprise CMY; and
the instructions to print the second pattern comprise instructions to print elements using a CMY ink combination.

14. The method of claim 13, wherein:
the non-infrared-absorbing colors of the second pattern also comprise any or all of the following: C, M, Y, CM, CY or MY; and
the instructions to print the second pattern comprise instructions to print elements using any of the following ink combinations: C, M, Y, CM, CY or MY.

15. The system of claim 14, wherein the non-infrared-absorbing colors exclude black.

16. The system of claim 11, wherein
the instructions to cause the print engine to print the copy of the security mark on the second substrate comprise instructions to print the copy of the security mark in a CMY color space; and
the instructions to cause the display to display the image comprise instructions to display the image in a second color space; and
the second color space is an RGB color space.

17. The system of claim 11, wherein the instructions to print the security mark comprise instructions to print the foreground and the background at substantially equal sizes.

18. The system of claim 11, wherein the security mark is a pantograph mark in which:
the foreground comprises a first pattern of dots;
the background comprises a second pattern of dots.

19. The system of claim 18, wherein the first pattern of dots exhibits a size or shape that differs from that of the second pattern of dots.

20. The method of claim 18, wherein either the first pattern of dots or the second pattern of dots includes CMY color elements, while the other pattern of dots does not include CMY color elements.

21. A document security marking system, the system comprising:
a processor
a print device; and
a computer-readable medium containing programming instructions that are configured to cause the processor to:
select a first pattern that comprises one or more non-infrared-absorbing colors,
select a second pattern that comprises one or more non-infrared-absorbing colors, wherein the first pattern and the second pattern exhibit substantially the same reflectance in the infrared spectrum, and
cause the print device to print a security mark on a first substrate in a first color space by:
printing one of the first pattern or the second pattern as a foreground, and
printing the other of the first pattern or the second pattern as a background,
wherein:
the non-infrared-absorbing colors of the first pattern comprise any or all of the following: C, M, Y, CM, CY or MY;
the instructions to print the first pattern comprise instructions to print elements using any of the following ink combinations: C, M, Y, CM, CY or MY;
the non-infrared-absorbing colors of the second pattern comprise CMY; and the instructions to print the second pattern comprise instructions to print elements using a CMY ink combination.

22. The method of claim 21, wherein:
the non-infrared-absorbing colors of the second pattern also comprise any or all of the following: C, M, Y, CM, CY or MY; and
the instructions to print the second pattern comprise instructions to print elements using any of the following ink combinations: C, M, Y, CM, CY or MY.

23. The system of claim 22, wherein the non-infrared-absorbing colors exclude black.

24. The system of claim 21, wherein
the instructions to cause the print engine to print the copy of the security mark on the second substrate comprise instructions to print the copy of the security mark in a CMY color space; and
the instructions to cause the display to display the image comprise instructions to display the image in a second color space; and
the second color space is an RGB color space.

25. The system of claim 21, wherein the instructions to print the security mark comprise instructions to print the foreground and the background at substantially equal sizes.

26. The system of claim 21, wherein the security mark is a pantograph mark in which:
the foreground comprises a first pattern of dots;
the background comprises a second pattern of dots.

27. The system of claim 26, wherein the first pattern of dots exhibits a size or shape that differs from that of the second pattern of dots.

28. A document security marking system, the system comprising:
a processor;
a print device; and
a computer-readable medium containing programming instructions that are configured to cause the processor to:
select a first pattern that comprises one or more non-infrared-absorbing colors,
select a second pattern that comprises one or more non-infrared-absorbing colors, wherein the first pattern and the second pattern exhibit substantially the same reflectance in the infrared spectrum, and
cause the print device to print a security mark on a first substrate in a first color space by:
printing one of the first pattern or the second pattern as a foreground, and
printing the other of the first pattern or the second pattern as a background;
wherein:
the instructions to cause the print engine to print the copy of the security mark on the second substrate comprise instructions to print the copy of the security mark in a CMY color space,
the instructions to cause the display to display the image comprise instructions to display the image in a second color space, and
the second color space is an RGB color space.

29. The system of claim 28, wherein the instructions to print the security mark comprise instructions to print the foreground and the background at substantially equal sizes.

30. The system of claim 28, wherein the security mark is a pantograph mark in which:
the foreground comprises a first pattern of dots;
the background comprises a second pattern of dots.

31. The system of claim 30, wherein the first pattern of dots exhibits a size or shape that differs from that of the second pattern of dots.

32. The method of claim 30, wherein either the first pattern of dots or the second pattern of dots includes CMY color elements, while the other pattern of dots does not include CMY color elements.

* * * * *